March 25, 1930.   E. HERKT   1,752,082
INTERNAL COMBUSTION ENGINE
Filed Jan. 21, 1926   3 Sheets-Sheet 1

March 25, 1930.   E. HERKT   1,752,082
INTERNAL COMBUSTION ENGINE
Filed Jan. 21, 1926    3 Sheets-Sheet 2
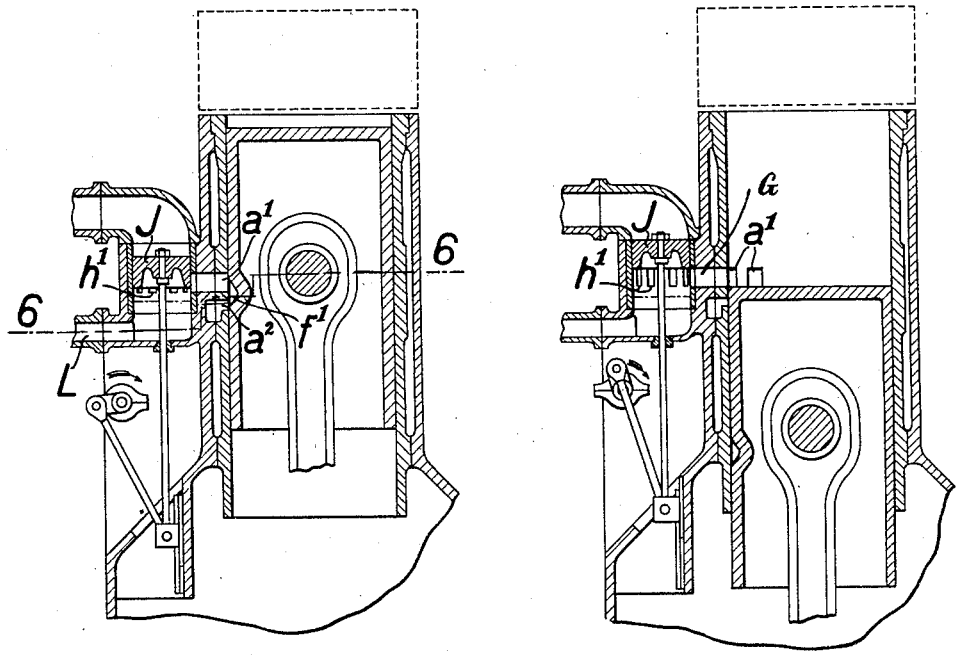
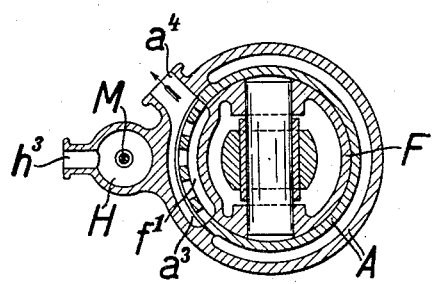

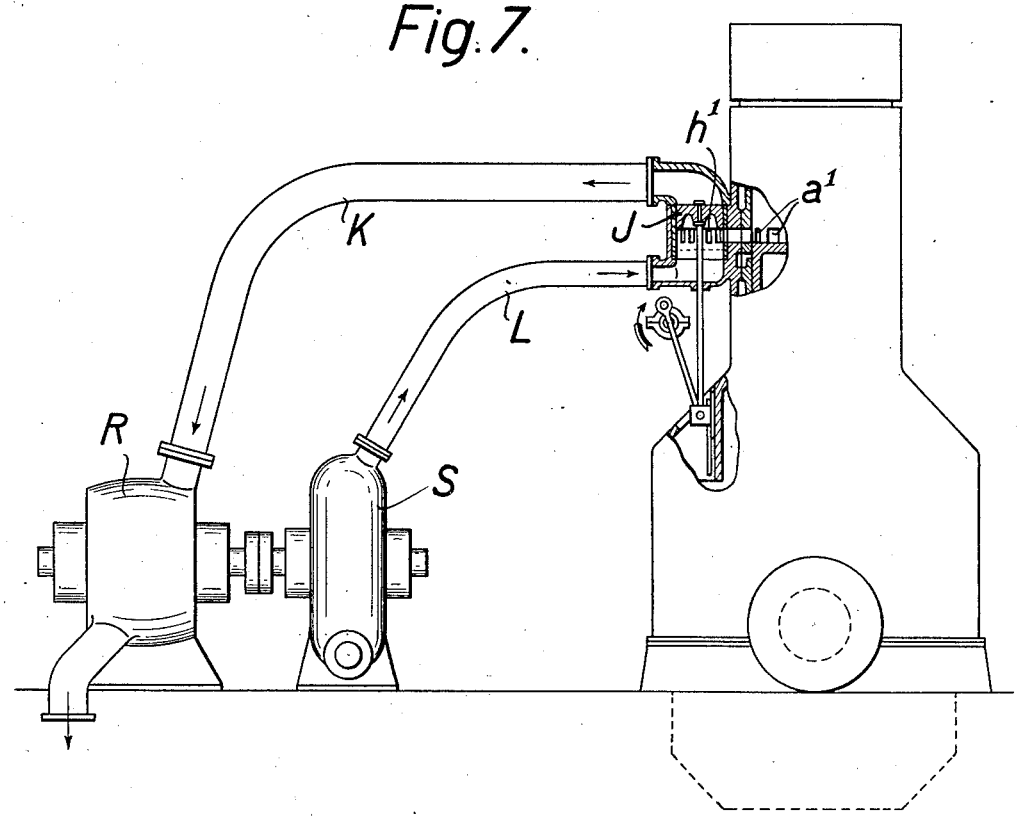

Patented Mar. 25, 1930

1,752,082

UNITED STATES PATENT OFFICE

ERNST HERKT, OF KIEL, GERMANY, ASSIGNOR TO FRIED. KRUPP GERMANIAWERFT, AKTIENGESELLSCHAFT, OF KIEL-GAARDEN, GERMANY

INTERNAL-COMBUSTION ENGINE

Application filed January 21, 1926, Serial No. 82,826, and in Germany February 7, 1925.

This invention relates to internal combustion engines which are combined with an exhaust gas turbine in which the energy still contained in the exhaust gases is converted into mechanical work and used for driving an air compressor. It has, more particularly, reference to such engines in which the exhaust gases designed to be fed to the turbine are withdrawn from the cylinder at the end of the expansion stroke, while the residue of exhaust gases is discharged into the atmosphere, and in which the compressed air is introduced into the cylinder as an additional charge at the beginning of the compression stroke.

The invention has for its object to provide an engine of the kind stated in which the means controlling the withdrawing of the exhaust gases and the introducing of the additional charge of air are particularly simple in their arrangement and at the same time very reliable in service.

This object is attained according to the invention by causing the withdrawing of the gases of combustion and the introducing of the additional air to take place through a common series of ports in the wall of the engine cylinder which are uncovered by the working piston in its lower dead centre position and by means of a slide valve alternately placed into communication with the conduit extending to the exhaust gas turbine and that extending to the air compressor.

An embodiment of the subject-matter of the invention is illustrated in the accompanying drawing in which:

Fig. 3 is a similar view with the piston in upper dead center position after the exhaust stroke.

Fig. 4 is a similar view with the piston in lower dead center position after the suction stroke.

Fig. 6 is a section along the line 6—6 of Fig. 3.

Fig. 7 is an organization view of the engine, turbine, and compressor, parts of the engine being broken away.

Figure 2:
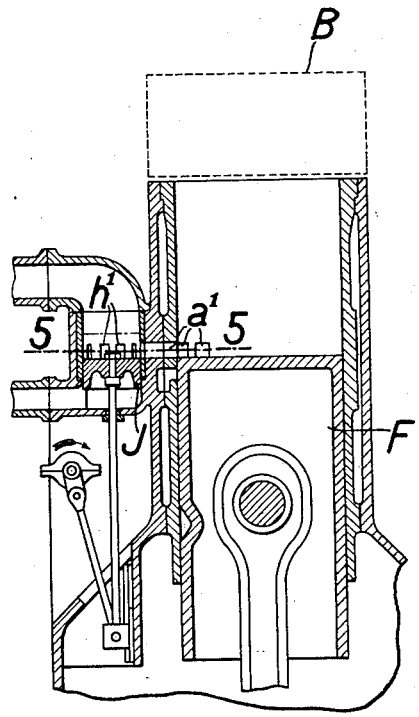
Fig. 2 is a similar view in lower dead center position after the work stroke.
Figure 5:
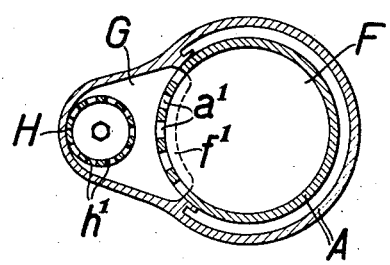
Fig. 5 is a section along the line 5—5 of Fig. 2.

The cooled engine cylinder A is closed at its top end by the likewise cooled cover B in which are mounted the admission valve C, the exhaust valve D and the fuel injection valve E. Mounted for working in the cylinder A is the piston F. In its lower dead centre position (Figs. 2 and 4), the piston uncovers a series of ports $a^1$ in the cylinder wall which open into a chamber G of about the height of the ports $a^1$, the chamber being kept very low with respect to the size of the clearance space. Extending through this chamber is a slide valve cylinder H, which is provided with a series of ports $h^1$ controlled by a piston valve J. Connected to the upper end of the slide valve cylinder H by means of a rectangularly bent connecting branch $h^2$ is a conduit K extending to the exhaust gas turbine R, while the lower end of the slide valve cylinder H has connected to it by means of a similar branch $h^3$ a conduit L coming from the compressors. The valve rod M extends through a stuffing box $h^4$ on to a crosshead N which is in connection with a crank gear P by means of a connecting rod O. The shaft Q of the crank P is driven by the engine shaft with half the number of revolutions of the latter. Arranged below the series of ports $a^1$ of the engine cylinder is another series of ports $a^2$ opening into a channel $a^3$ which is arranged in the cylinder wall and connected with the exhaust conduit by means of a branch $a^4$ (see Fig. 6) and a pipe (not shown). In the upper dead centre position of the piston the series of ports $a^1$ and $a^2$ are adapted to be placed into communication with each other by means of a recess $f^1$ of semi-circular cross-section provided in the piston F.

Figure 1:
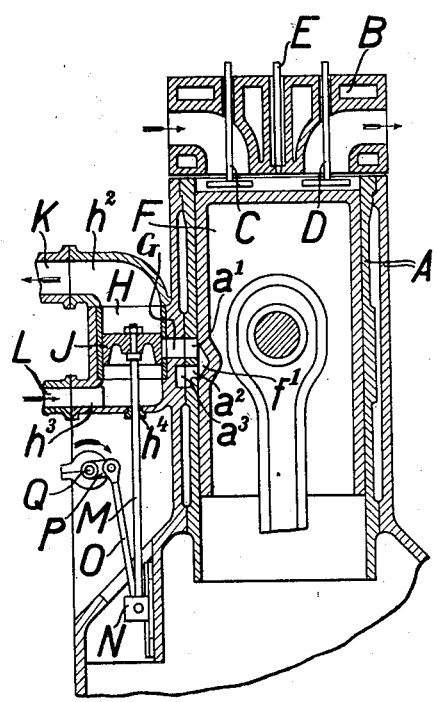
Fig. 1 is a vertical section through the cylinder of a single acting four-stroke cycle engine with the piston shown in upper dead center position after the compression stroke.

The operation of the engine is as follows:

In Fig. 1, the piston F assumes its upper dead centre position at the end of the compression stroke, and the slide valve J is in the position in which it covers the series of ports $h^1$. The ensuing ignition and combustion drive the piston downward and the gases of combustion expand. At the end of the expansion stroke (Fig. 2) the upper edge of the piston F has uncovered the series of slots $a^1$. At the same time the valve J is about in its lower dead centre position too, so that the slots $h^1$ are entirely open. The gases of combustion contained in the cylinder and having still a certain pressure, such as for instance 0.7 atmospheres above atmospheric, flow through the ports $a^1$ into the chamber G and further through the ports $h^1$ into the space $h^2$ and through the conduit K into the exhaust gas turbin R where they do work. During the succeeding upward movement the piston F again covers the ports $a^1$ and expels the burnt gases still contained in the cylinder into the atmosphere through the exhaust valve D which is being opened. At the same time, the slide valve J has also moved upwards and, in the dead centre position of the piston F, assumed the position illustrated in Fig. 3. This upward movement of the slide valve is still continued during the ensuing downwardly directed suction stroke of the piston F and, as soon as the upper edge of the piston F has again uncovered the ports $a^1$ at the end of the suction stroke (Fig. 4), the piston valve J is about in its upper dead centre position so that communication is established between the interior of the cylinder and the compressed air conduit L through $a^1$, G, $h^1$, $h^3$. In this position (Fig. 4), air compressed to about 0.7 atmospheres above atmospheric flows from the compressor S through the conduit L into the engine cylinder. This additional charge causes the air sucked into the cylinder to be likewise compressed to about 0.7 atmospheres above atmospheric whereby an increase of the output by about 50 per cent is obtained if the proportion of air and fuel for the working process remains the same as in working without previous compression.

During the operation described there arises the following difficulty: After the exhaust gases have flown at the end of the expansion stroke (Fig. 2) through the ports $a^1$ and $h^1$ and the conduit K into the exhaust gas turbine and the ports $a^1$ have thereupon been closed again by the piston F, the chamber G remains filled with exhaust gas. If the pre-compressed air is then admitted into the engine cylinder A at the end of the suction stroke (Fig. 4), this air would blow the exhaust gases left in the chamber G into the interior of the cylinder, whereby the good combustion striven for would be strongly derogated. This drawback is avoided by the arrangement of the ports $a^2$ and the recess $f^1$ in the piston F. When the piston has reached its upper dead centre position (Fig. 3) at the end of the exhaust stroke, the ports $a^1$ and $a^2$ are placed into communication by the recess $f^1$. The arrangement is made so that, in the upper dead centre position (Fig. 3), the series of ports $h^1$ has already been uncovered for a little amount by the lower edge of the upwardly moving piston valve J. A small quantity of air will then flow already from the compressor through L and $h^3$ into the chamber G and scavenge the exhaust gases contained therein through $a^1$, $f^1$, $a^2$ into the annular channel $a^3$ (Fig. 6) and from the latter into the exhaust conduit. Therefore, the whole chamber G is already filled with fresh air at the beginning of the admission of the additional charge into the cylinder.

The connection of the ports $a^1$ and $a^2$ by the recess $f^1$ of the piston is also established in the dead centre position following the compression stroke of the piston (Fig. 1). The relative motion of the valve J is so controlled that during this time the ports $h'$ of the valve are covered. A mechanism adapted to control the valve J in this manner is the crank drive shown in Figs. 1 to 4 whose shaft Q is mounted at one side of the axis of the connecting rod M.

It is, of course, to be understood that the invention is not limited to the use of a crank gear of the kind shown, but that the described operation of the slide valve may also be attained by other kinds of gears.

Claims:

1. A four stroke cycle internal combustion engine comprising a working cylinder and piston and exhaust and inlet valves at the head of said cylinder adapted to be opened in the normal manner during the exhaust and suction strokes respectively, a port in said cylinder so positioned as to be uncovered by said piston only when said piston is substantially at lower dead center, a turbine air compressor, a conduit connecting said port to said turbine for supplying to the latter exhaust gases escaping through said port at the end of the expansion stroke of said piston, a conduit connecting said air compressor to said port for supplying a charge of compressed air to the cylinder at the end of the suction stroke of said piston, and valve means for alternately opening and closing said conduits in accordance with the strokes of said piston.

2. A four stroke cycle internal combustion engine having the features set forth in claim 1 in which said valve means comprises a flat chamber adjacent and in communication with said port, a piston valve cylinder traversing said chamber, said exhaust gas conduit and said compressed air conduit being connected to the opposite ends of said piston valve cylinder, a port in the wall of said piston valve cylinder communicating with said chamber, a valve piston in said last mentioned cylinder adapted to cover the port thereof, and means for alternately moving said valve piston above and below said port for placing said chamber in communication with said exhaust gas conduit or said compressed air conduit.

3. In a four stroke cycle internal combustion engine having the features set forth in claim 1, a second port in said working cylinder below said first mentioned port, an exhaust conduit connected to said second mentioned port, and a recess in said piston adapted to connect said two ports when said piston is in upper dead center position.

4. In a four stroke cycle internal combustion engine having the features set forth in claim 1, a second port in said working cylinder below said first mentioned port, an exhaust conduit connected to said second mentioned port, a recess in said piston adapted to connect said two ports when said piston is in upper dead center position, and means for controlling said valve means so that said compressed air conduit is placed in communication with said first mentioned port when said working piston is in upper dead center at the end of the exhaust stroke, and so that neither said exhaust gas conduit nor said compressed air conduit are in communication with said first mentioned port at the end of the compression stroke.

5. A four stroke cycle internal combustion engine having the features set forth in claim 1 in which said valve means comprises a flat chamber adjacent and in communication with said port, a piston valve cylinder traversing said chamber, said exhaust gas conduit and said compressed air conduit being connected to the opposite ends of said piston valve cylinder, a port in the wall of said piston valve cylinder communicating with said chamber, a valve piston in said last mentioned cylinder adapted to cover the port thereof, means for alternately moving said valve piston above and below said port for placing said chamber in communication with said exhaust gas conduit or said compressed air conduit, a second port in said working cylinder below said first mentioned port, an exhaust conduit connected to said second port, a recess in said working piston adapted to connect the two ports of said working cylinder, and means for controlling said valve piston in such a manner that said compressed air conduit is placed in communication with said chamber at the upper dead center position of said working piston at the end of the exhaust stroke, while the port of said piston valve cylinder is closed at the end of the compression stroke.

6. A four stroke cycle internal combustion engine having the features set forth in claim 1 in which said valve means comprises a flat chamber adjacent and in communication with said port, a piston valve cylinder traversing said chamber, said exhaust gas conduit and said compressed air conduit being connected to the opposite ends of said piston valve cylinder, a port in the wall of said piston valve cylinder communicating with said chamber, a valve piston in said last mentioned cylinder adapted to cover the port thereof, means for alternately moving said valve piston above and below said port for placing said chamber in communication with said exhausts gas conduit or said compressed air conduit, a second port in said working cylinder below said first mentioned port, an exhaust conduit connected to said second port, a recess in said working piston adapted to connect the two ports of said working cylinder, and means for controlling said valve piston in such a manner that said compressed air conduit is placed in communication with said chamber at the upper dead center position of said working piston at the end of the exhaust stroke, while the port of said piston valve cylinder is closed at the end of the compression stroke, said valve piston controlling means comprising a crosshead, a connecting rod between said valve piston and said crosshead, a crank having a center of rotation at one side of the axis of said connecting rod, and a second connecting rod between said crank and said crosshead.

The foregoing specification signed at Hamburg, Germany, this 14th day of December, 1925.

ERNST HERKT.